Nov. 30, 1965  H. B. SCHULTZ  3,220,190
VALVE MEANS
Filed Dec. 26, 1962
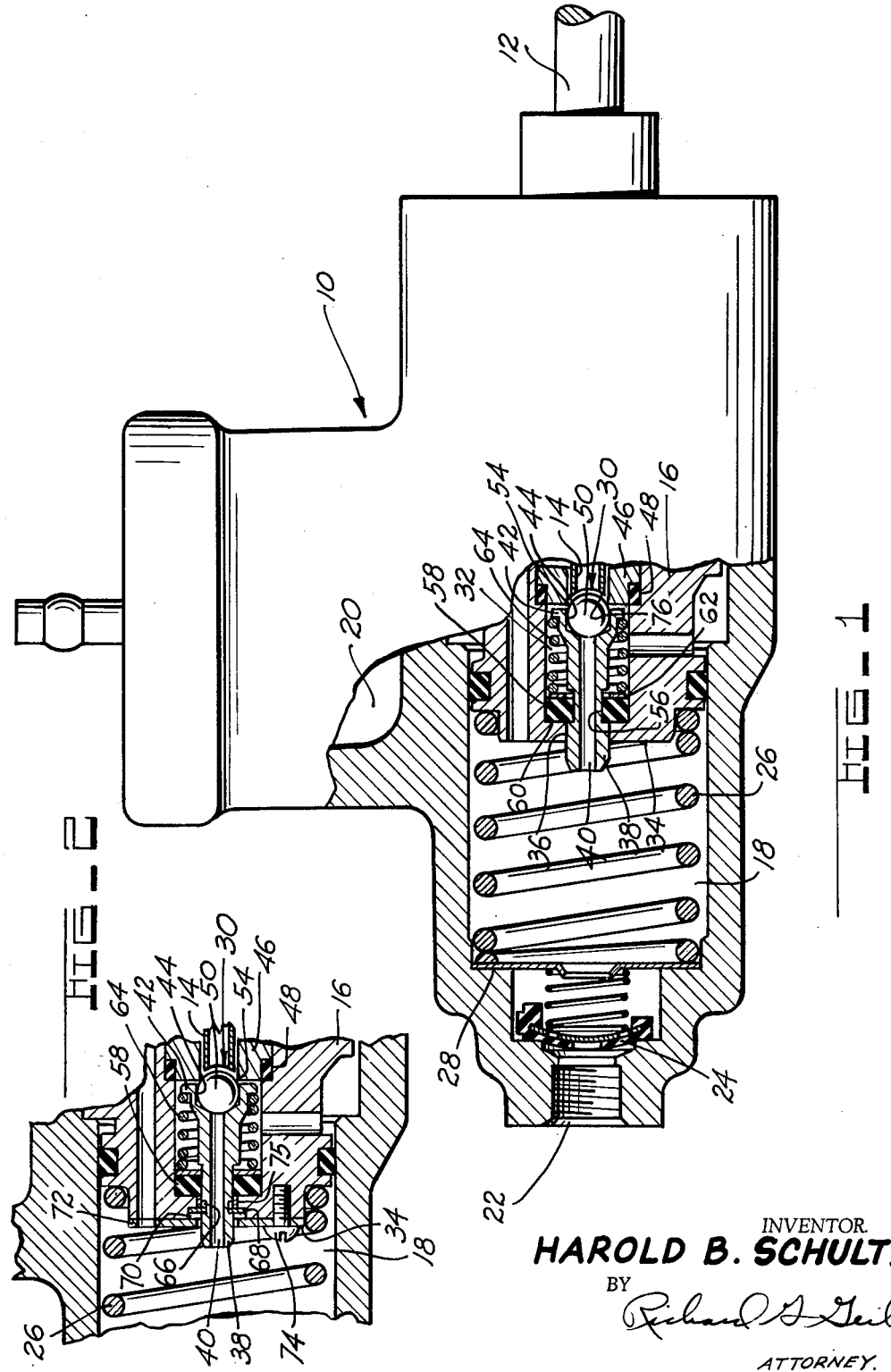
INVENTOR.
HAROLD B. SCHULTZ
BY
Richard A. Geib
ATTORNEY.

United States Patent Office 3,220,190
Patented Nov. 30, 1965

3,220,190
VALVE MEANS
Harold B. Schultz, South Bend, Ind., assignor to The Bendix Corporation, South Bend, Ind., a corporation of Delaware
Filed Dec. 26, 1962, Ser. No. 246,978
2 Claims. (Cl. 60—54.6)

This invention relates to a means for balancing forces acting on a valve such as may be found controlling a pressurized fluid within a power brake system having provision for manual operation. In addition, this invention relates to means for sealingly mounting valve structure such that friction forces affecting valve operation are minimized.

It is accordingly an object of this invention to provide a valve having a stem area and a seat area equal to each other to provide a balanced valve.

It is another object to provide a seal for a valve stem which does not impose frictional forces on the valve operation.

These and other objects and advantages will be readily apparent to those skilled in the art to which this invention relates from reading the following description of the accompanying drawings in which:

FIGURE 1 shows a partially sectioned side view of a power brake device embodying a valve in accordance with my invention; and FIGURE 2 shows a modified valve mounting device.

In more detail with reference to FIGURE 1, I show a power braking device 10 such as may be found described in greater detail in my copending United States application No. 232,173. Such a device receives its operating force by way of a rod 12 which, by way of illustration, may be connected to a brake pedal (not shown) within a vehicle to be controlled by the foot of an operator thereof. The rod is operatively connected to a valve control plunger 14 and to a piston 16 by means shown in my above-mentioned copending application; which connection allows sequential movement of the plunger and the piston. As seen, the power brake device also includes a variable volume chamber 18 and a reservoir chamber 20. The variable volume chamber 18 is provided with an outlet port 22, and a two-way check valve restrictor 24 is provided in chamber 18 adjacent port 22 to prevent pressure surging. In addition, a heavy spring 26 is mounted between end wall 28 and the piston 16 to provide resistance to piston movement decreasing the volume of chamber 18.

As for my valve construction, I show a valve 30 consisting of a stem 38 and a ball 50 axially mounted in a valve chamber 32 interiorly of piston 16. In more detail, the wall 34 of piston 16 is drilled, as at 36, and a valve stem 38 is slidably mounted therethrough. The valve stem 38 is provided with an axially extending passage 40 leading to an enlarged head 42 having an axial bore 44 communicating with chamber 18 by way of passage 40.

The valve chamber 32 is closed opposite the wall formed by face 34 of piston 16 by a valve seat member 46 and a seal 48 held between seat 46 and the piston structure, as seen. The seat 46 is removably affixed to the piston 16 as by any one of the manifold means available to those skilled in the art.

A ball valve 50 is positioned by bore 44 of the valve stem 38. The ball contacts the seat 46 along the annular lip 54. This contact area and the diameter of stem 38 are made equal to balance the valve structure with respect to inlet pressure in valve chamber 32.

In order to seal the valve chamber 32 from the chamber 18 I have found that the valve stem can be grooved, as at 56, and an elastomeric ring 58 of rubber or synthetic rubber or any elastomer may be fitted into the groove 56. The ring is then held against the end wall 60 of chamber 32, and the aligned edge of the retaining groove in stem 38, by spring forces exerted through a bearing plate 62 about the outer periphery of ring 58 by a spring 64 compressed between the head 42 and the bearing plate 62. The ring allows minute movement of stem 38 to remove the ball valve from contact with seat 46, with ring 58 acting as a diaphragm, and does so without adding friction forces, such as would be caused by sliding contact of stem 38 and a fixed seal.

As seen in FIGURE 2 it has been proposed to groove the valve stem, as at 66, adjacent the entry of stem 38 into chamber 18. This allows a "C" washer 68 to be fitted to piston 16 on face 34 within a groove 70. As seen, the "C" washer is held for limited movement in groove 70 by an end plate 72 bolted as at 74, to face 34 of piston 16, and a sliding sleeve 75 is fitted about stem 38 to increase the effective stem diameter to equal the inlet valve seat diameter. With this arrangement valve 30 is allowed to control power fluid, and in the event of power failure, the diaphragm or ring 58 is not overstressed due to limited movement allowed by the "C" washer 68 within the limits of grooves 66 and 70.

With either structure above described, the force of return spring 64 is just great enough to overcome seal friction.

As may be understood by reading the aforesaid copending patent application Serial No. 232,173 a pressurized fluid is directed to the valve chamber 32 by way of a radial passage in the piston 16.

In operation an outlet seat 76 is urged against ball 50 to unseat ball 50 from the inlet seat 46. Thus, the pressurized fluid acts on the annular area of ball 50 between the inlet and outlet seats and on the end of stem 38 on greater area. The valve is unbalanced as to working pressures by the amount of the outlet valve seat area. This means that as working pressure increases so does unbalance. However, forces acting on the valve and stem during the opening of the valve at higher presssures is less critical.

To prevent pressure expulsion of ball 50 from bore 44 bore 40 will vent any leakage behind the ball to chamber 18.

The foregoing description was presented in order to show but one form where my invention may be utilized. It is not intended that such is to be limitative to the scope of my invention, which may be realized from the appended claims by those skilled in the art.

I claim:
1. In a full hydraulic power system having a manually operable pressure producing device adapted to control a variable volume chamber in the event of a power failure, a power valve comprising in combination:
    a valve chamber in said pressure producing device;
    a ball valve;
    a valve seat within said pressure producing device at one end of said valve chamber which seat is adapted to cooperate with said ball valve to control a pressurized fluid, said seat having an area of contact for said ball valve;
    a valve stem operatively connected to said ball valve, said valve stem having a cross-sectional area of a portion immediately behind its operative connection with said ball valve which area is equal to said area of contact of said ball valve with said valve seat, said valve stem further having a grooved portion and an internally drilled passage from said end opposite that operatively connecting said ball valve thereto leading inwardly to said ball valve immediately behind its face that cooperates with said valve seat;
    an annular flexible member whose inner surface is fitted into said groove of said valve stem and whose outer diameter is equal to said valve chamber to locate said valve stem internally of said valve chamber; and a spring means operatively connecting said annular flexible member in said valve chamber to said pressure producing device to project said valve stem externally of said valve chamber into the variable volume chamber through an appropriately sized opening in said pressure producing device with said annular flexible member overlying said opening to form a holding means for said valve stem and a seal for said opening, said spring means being arranged in said valve chamber to bias said valve stem and its operatively connected ball valve into contact with said valve seat at the other end of said valve chamber while holding said annular flexible member to said pressure producing device.

2. In a full hydraulic power system having a manually operable pressure producing device adapted to control a variable volume chamber in the event of a power failure, a power valve comprising in combination:

a valve chamber in said pressure producing device;

a ball valve;

a valve seat within said pressure producing device at one end of said valve chamber which seat is adapted to cooperate with said ball valve to control a pressurized fluid, said seat having an area of contact for said ball valve;

a valve stem slidably mounted through an opening in said pressure producing device at the end of said valve chamber opposite the valve seat, said valve stem being operatively connected to said ball valve, said stem also including a portion projecting out of said pressure producing device into said variable volume chamber and having an axial passage therethrough leading from the connection of the ball valve therewith to the variable volume chamber;

an annular flexible member affixed to said valve stem adjacent said portion thereof projecting through said pressure producing device, said annular member having a radial dimension substantially equal to said valve chamber and being within said valve chamber to locate said stem therein;

a spring compressed between said annular member and the end of said valve stem operatively connected to said ball valve to seat said flexible member around said opening and to project said ball valve onto said seat; and stop means operatively connected to said pressure producing device and said portion of said stem projecting into said variable volume chamber which stop means limits movement of said valve stem to a nominal displacement within the stress capabilities of said annular flexible member.

References Cited by the Examiner

UNITED STATES PATENTS

| | | | |
|---|---|---|---|
| 2,326,116 | 8/1943 | Baldwin | 60—54.6 |
| 2,656,680 | 10/1953 | Brunner | 60—54.6 |
| 2,925,805 | 2/1960 | Schultz | 60—54.6 |
| 2,929,216 | 3/1960 | Stelzer | 60—54.6 |
| 3,082,744 | 3/1963 | Gardner | 60—54.6 |
| 3,109,282 | 11/1963 | Price | 60—54.6 X |

JULIUS E. WEST, *Primary Examiner.*

EDGAR W. GEOGHEGAN, *Examiner.*